Sept. 26, 1961 W. E. PROEBSTER 3,002,184

PULSE GATING DEVICE

Original Filed Nov. 14, 1957

INVENTOR.
WALTER E. PROEBSTER

United States Patent Office 3,002,184
Patented Sept. 26, 1961

3,002,184

PULSE GATING DEVICE

Walter E. Proebster, Zollikerberg, Zurich, Switzerland, assignor to International Business Machines Corporation, New York, N.Y., a corporation of New York Original application Nov. 14, 1957, Ser. No. 696,500. Divided and this application Mar. 23, 1959, Ser. No. 801,411
Claims priority, application Switzerland Feb. 18, 1957
6 Claims. (Cl. 340—174)

This invention relates to pulse gates and more particularly to pulse gates employing biased magnetic cores and is a divisional of application Serial Number 696,500 filed November 14, 1957.

Pulse gates employing magnetic cores are described in the prior art in switching arrangements for performing logical operations. Known pulse gates, however, generally require diodes which necessarily limit the upper frequency at which they can be pulsed. Where pulse gates are controlled by ferro-resonant elements, for example, the diodes unnecessarily limit the upper pulse frequency of the circuit.

The present invention provides a pulse gate employing biased magnetic cores, and is operable to produce an output pulse in response to each input pulse. A bipolar gate is also provided which is responsive to input pulses of either polarity.

Accordingly, to the present invention there is provided a pair of magnetic cores each having an input, control, bias, and output windings. Each of the corresponding windings of the two cores may be connected in series or in parallel to provide a common connection for receiving current pulses. A direct current is applied to the bias winding of the pair of cores to provide saturation magnetization of one polarity in both cores. The control windings embrace the cores to apply, when energized, a magnetizing force of opposite polarity. However, the force produced by the control current is insufficient to overcome the bias force. Similarly, the force produced by an input pulse is insufficient to overcome the bias force. But when the control and input windings are energized simultaneously, a magnetizing force of opposite polarity and greater magnitude than the bias force, is applied to the cores. This force drives one of the cores to the opposite state of saturation magnetization, thereby producing an output pulse of the same polarity as the input pulse. At the termination of the input pulse, the core which was switched is returned to the state of saturation maintained by the bias force.

The windings of the two cores are arranged so that the application of a positive direction input pulse, for example, to the gating circuit coincidentally with a control pulse switches one of the cores to produce an output pulse of the same polarity. Likewise, a negative direction input pulse switches the other core to produce a negative direction output pulse. Hence, the novel bipolar pulse gate is responsive to input pulses of either polarity to produce an output pulse of like polarity.

The novel gating circuit is particularly adaptable for use with ferro-resonant elements employed to control the gates. A ferro-resonant flip-flop produces an alternating current output of either a relatively large or small amplitude, depending on the state of the flip-flop. The alternating current output of a ferro-resonant flip-flop can be used as the control current for the novel pulse gate, whereby the gate may be operated when the larger amplitude control current is applied thereto.

Accordingly, an object of the present invention is to provide a magnetic pulse gate, particularly for control by means of a ferro-resonant flip-flop switch in which the upper limit of the pulse frequency depends only on the ferro-resonant circuit element.

Another object of the invention is to provide a magnetic pulse gate which has the characteristics of amplification.

An additional object is to provide a novel pulse gate comprising a magnetic core biased to operate at a point of saturation magnetization and including control means for selectively permitting the rendition of an output pulse in response to an input pulse of a predetermined polarity.

A further object is to provide a novel switching device comprising a magnetic core biased to operate at a saturation point on the hysteresis curve thereof, and including input, output and control windings, said control winding being connected to a ferro-resonant bistable circuit element which controls the capability of said switch to produce an output pulse in response to an input pulse.

Still a further object of the invention is to provide a pulse gate whose reliability is increased by the elimination of diodes.

Another object of the invention is to provide a novel magnetic pulse gate which is responsive to bipolar pulses.

A further object is to provide a novel magnetic switching device comprising a plurality of magnetic cores each biased to operate at a point of saturation magnetization, said cores having common input, output and control means for controlling the production of an output pulse of either polarity in response to an input pulse of either polarity.

An additional object is to provide a novel magnetic switch comprising a plurality of magnetic cores having common input and output and control means, said control means including a ferro-resonant bistable element for controlling the capability of said switch to produce an output pulse in response to an input pulse of any polarity.

Another object of the invention is to provide a novel storage chain comprising a plurality of ferro-resonant bistable circuit elements intercoupled by magnetic cores, each said core being controlled by one of said elements to control the status of a further one of said elements.

Other objects of the invention will be pointed out in the following description and claims and illustrated in the accompanying drawing, which discloses, by way of example, the principle of the invention and the best mode, which has been contemplated, of applying that principle.

Figure 1:
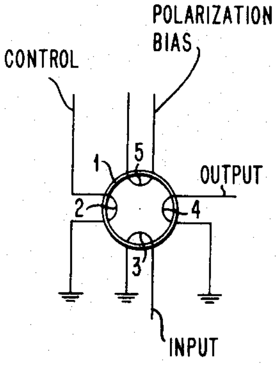
FIG. 1 is a diagrammatic representation of a magnetic pulse gate.

As diagrammatically represented in FIG. 1, the pulse gate has an annular core 1 having a control winding 2 for the control current, an input winding 3, an output winding 4, and a winding 5 for a direct current polarization or bias. The annular core is of ferro-magnetic material.

In one form of construction, the core consists of ferrite and may have an external diameter of 2.5 mm. In this example, control winding 2 may comprise two turns; input winding 3 ten turns; output winding 4 five turns; and, polarization coil 5, ten turns of wire. It is to be understood, however, that the invention is not to be limited by the specifications recited.

Figure 2:
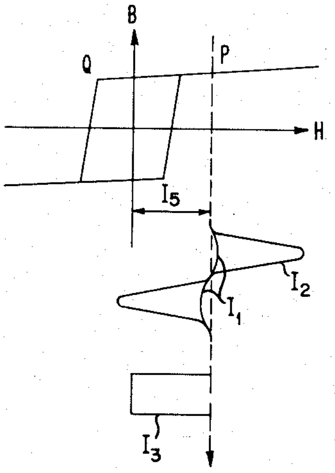
FIG. 2 is a diagram depicting the operation of the gate of FIG. 1.

In FIG. 2, the magnetization curve of the core, that is, the dependence of magnetic induction B on intensity of magnetic field H, is represented. The point P of FIG. 2 is referred to herein as the operating point of the core. Superimposed on a line intersecting operating point P are representations of a smaller control alternating current $I_1$, a greater control alternating current $I_2$, an input pulse current $I_3$, and a polarization current $I_5$. While the control current is illustrated as an alternating current, it is to be understood that individual current pulses may be used in place thereof. The current signals $I_1$ through $I_5$, are applied to windings 1 through 5, respectively, of FIG. 1.

If the core and the windings are of the dimensions given hereinabove, the ratio of the lesser control alternating current to the greater may be substantially 1:14, the latter having an intensity of approximately 0.7 ampere, while the polarization-direct current $I_5$ is approximately 0.04 ampere. A ferro-resonant flip-flop switch, not shown in FIG. 1, delivers the control alternating current, which has a frequency of 200 kilocycles per second.

The operating point P of FIG. 2 represents the saturation of magnetic flux in the core in one direction. The operating point P is established by the bias current $I_5$, applied to the control winding 5.

With respect to operating point P, neither the greater control alternating current $I_2$ alone, nor the lesser control alternating current $I_1$ together with the input pulse current $I_3$, can cause the core to be switched to the opposite state, i.e., can exceed point Q of the magnetization curve. The core can be switched, however, when the greater control alternating current $I_2$ occurs simultaneously with an input pulse current $I_3$. In order for the switching of the core to occur, the currents $I_2$ and $I_3$ must be of the same polarity and must be synchronized to occur simultaneously.

The half cycle of the control alternating current is at least equal to the duration of the input pulse. Also, each control current half cycles must produce in the core a field of the same direction as the field produced by the input pulses $I_3$.

When the core is switched beyond point Q, an electric potential is induced in output winding 4 by the change in flux in the core. Output pulses are produced in output winding 4 only when the greater control alternating current $I_2$ is applied to winding 2. Under these operating conditions, the magnetic pulse gate is said to be "On" or "opened."

If, however, the small control alternating current $I_1$ is applied to winding 2, the core is not switched, and, therefore, for all practical purposes no flux change occurs in core 1. Thus, a potential is not induced in output winding 4. Under these conditions, the magnetic pulse gate is said to be "Off" or "closed."

When employing the novel magnetic gate of FIG. 1, the time between successive input pulses can be reduced to the time required to convert the governing ferro-resonant flip-flop switch from one of its two stable positions to the other. As a result of the reduction of this time, the input pulse frequency can be raised. At the same time, the alternating control current produced by the ferro-resonant flip-flop switch which governs the novel pulse gate, can have a higher frequency. The values of control alternating current $I_1$ and/or $I_2$ and of the polarization direct current $I_5$ are not critical so that no special stabilization measures are required for these currents. Even the synchronization between the input pulses and the control alternating current, which can be handled centrally for a switching arrangement with several ferro-resonant flip-flop switches and magnetic pulse gates, does not need to be very precise. The pulse gate described has amplification characteristics, since the control alternating current contributes to the production of the output pulse.

The simple magnetic pulse gate shown in FIG. 1 can transmit only unipolar impulses. That is, the gate can transmit only pulses of current which apply a M.M.F. (magneto motive force) to the core having a direction which is opposite to the M.M.F. produced by the polarization current $I_5$. The gate blocks pulses of the other direction of current, even when it is in the "open" (On) position, i.e., when it is driven by the greater control current $I_2$. The reason for this discrimination is that the rejected input pulses increase the field intensity in the direction of the polarization M.M.F. and thus do not attempt to drive the core toward the opposite remanent state.

For the transmission of bipolar pulses, that is, pulses of either direction of current, two magnetic pulse gates can be arranged in a joint circuit having common input, control polarization and output terminals. In principle, corresponding windings of two magnetic gates can be connected in parallel or in series. Care must be taken, however, in the joint circuit that in the "open" position, the direction of the windings are such that one pulse gate relays the pulses of one direction of current and the other pulse gate relays those of the other direction of current. This type of operation will be insured if the control windings and the polarization windings of both pulse gates are connected in the same direction, and if the input winding as well as the output pulse winding of one pulse gate are connected in opposite directions with respect to the corresponding windings of the other gate.

Figure 3:
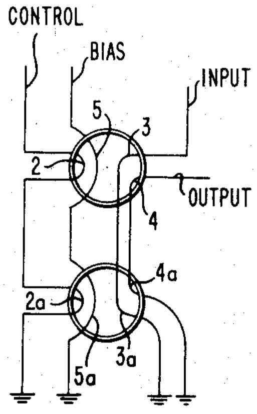
FIG. 3 illustrates a switch comprising two pulse gates of the type illustrated in FIG. 1 for controlling the transmission of bipolar pulses.

Referring to FIG. 3, there is shown two magnetic pulse gates arranged in a series connection. The control windings 2, 2a and polarization windings 5 and 5a of both pulse gates are connected together in the same direction, and input windings 3 and 3a are connected together in opposite directions. Accordingly, when control current $I_2$ is present, one pulse gate relays input pulses of one direction of current, and the other gate transmits in exactly the same way input pulses of the opposite direction of current. Since output windings 4 and 4a are connected together in opposite directions, the output pulses of the respective pulse gates are produced in the joint output circuit, each having the same phase as the corresponding input pulse. Thus, bipolar pulses are formed in the output circuit.

The same result is also obtained when the control winding and the polarization winding of one pulse gate are connected in opposite directions with respect to the corresponding windings of the other pulse gate, and the input winding as well as the output winding of the one pulse gate are connected in the same direction as the corresponding windings of the other pulse gate.

Circuit employing two pulse gates of the type shown in FIG. 3 have the advantage of an especially small noise level in the output circuit. This result stems from the fact that the two gates are interconnected in a common direction and partly in opposite direction so that the individual gates provide compensatory interference voltages.

Figure 4:
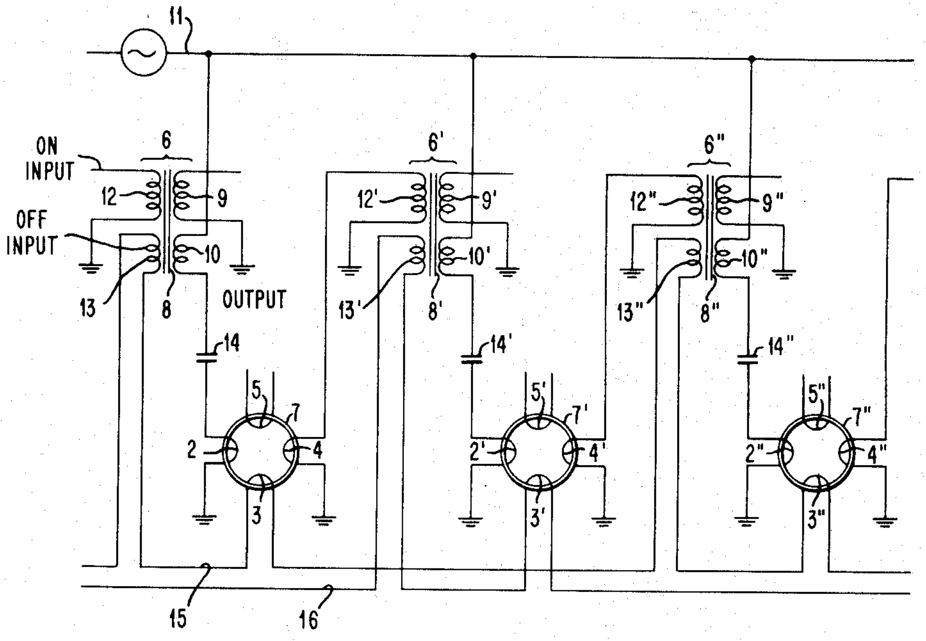
FIG. 4 is a circuit diagram of a three-stage shifting register employing magnetic pulse gates and bistable ferro-resonant switches.

FIG. 4 illustrates the utilization of the magnetic pulse gate in a simple pulse storing circuit. The primed reference characters of FIG. 4 designate corresponding components of the various stages. Each of the three stages shown includes a ferro-resonant flip-flop 6 and a magnetic pulse gate 7. Each flip-flop comprises a ferro-magnetic core 8 having a polarization winding 9, an output winding 10 having one terminus connected to conductor 11 and two control windings 12 and 13. Control winding 12 serves to shift, or transfer, the flip-flop into the position in which it delivers the greater control alternating current ($I_2$), and winding 13 serves to shift the flip-flop into the position in which it delivers the lesser control alternating current ($I_1$). In the output circuit of each flip-flop there is provided a capacitor 14 which is connected between the other terminus of winding 10 and control winding 2 of the associated magnetic pulse gate.

The basic theory of operation of ferro-resonant flip-flop circuits (such as 6 of FIG. 4) is now well known in the art, and thus is not set forth herein. However, for a concise explanation reference may be made to an article by Carl Isborn, entitled "Ferroresonant Flip-Flops," published in Electronic, April 1952, pages 121–123, which is incorporated herein by reference.

Magnetic pulse gate 7 has the control winding thereof coupled to output winding 10 of flip-flop 6, and its output winding 4 is connected to winding 12′ of the following flip-flop 6′. Input winding 3 of magnetic pulse gate 7 is connected in series with the control winding 13 of flip-flop unit 6. Similarly, input windings 3′ and 3″ are respectively connected in series with control windings 13′ and 13″ of the corresponding ferro-resonant flip-flops. Note that input windings 3 and 3″ of the first and third pulse gates 7 and 7″ and the control windings 13 and 13″ of flip-flop units 6 and 6″ are serially connected in a first circuit 15, and input winding 3′ of the second pulse gate 7′ is connected in a second series circuit 16. The circuits 15 and 16 are alternately energized in order to advance the "On" positions of the chain of FIG. 4. The winding 12 of flip-flop 6 constitutes the input to the chain, and winding 4″ of stage 7″ is the output of the chain.

Assume, for example, that flip-flop unit 6 is On so that it is delivering greater control current ($I_2$), and that flip-flop units 6′ and 6″ are both Off thus delivering the lesser control alternating current ($I_1$). Accordingly, magnetic pulse gate 7 is "open," and magnetic pulse gates 7′ and 7″ are "closed." If a current pulse is applied to conductor 15, it will be transmitted by pulse gate 7 to control winding 12′ of flip-flop unit 6′. Unit 6′ is then flipped On to deliver the greater control alternating current ($I_2$). At the same time, flip-flop unit 6 is turned Off, thereby delivering the lesser control alternating current ($I_1$).

Therefore, by means of the pulse on conductor 15, pulse information stored in flip-flop unit 6 of uneven ordinal number (i.e., odd numbered stages of the chain) is transmitted to the following flip-flop unit of even ordinal number. Correspondingly, by means of a pulse on conductor 16 stored information is transferred from a flip-flop unit of even ordinal number to a flip-flop unit of uneven ordinal number.

An advantageous feature of the pulse storing circuit of FIG. 4 is that the working position of a ferroresonant flip-flop unit which controls a pulse gate can be changed from Off to On or vice versa, during the appearance of an input pulse at the pulse gate. Moreover, the retardation or delay characteristic of the ferro-resonant flip-flop unit during the switching time of the gate, functions as a means for storing data.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A chain of magnetic elements for storing a plurality of pulses including the combination of: a plurality of ferro-resonant flip-flops each having an On input winding, an Off input winding and an output winding, each said flip-flop producing an alternating current output having a greater magnitude when said flip-flop is On and having a lesser magnitude when said flip-flop is Off; a plurality of magnetic pulse gates each provided with a control winding, a bias winding, an input winding and an output winding; the control winding of each said gate being coupled to the output winding of the previous flip-flop of said chain and the output winding of each said gate being coupled to the On input winding of a subsequent flip-flop of said chain; the input winding of each of said gates being connected in series with the Off input winding of the preceding flip-flop; the input winding of said gate and the Off input winding of the preceding flip-flop of even-numbered stages being connected in series to a first transfer terminal and corresponding windings of odd-numbered stages being connected in series to a second transfer terminal whereby the application of a current pulse to one of said transfer terminals causes a flip-flop in the On state to be turned Off and simultaneously causes the pulse gate coupled to the output of a flip-flop which is switched, to transfer a pulse through said gate to the succeeding flip-flop in the chain thereby turning said succeeding flip-flop On.

2. A register comprising the combination of a plurality of non-linear circuits having an On input winding, an Off input winding and an output winding, each said circuit operative to produce an alternating current output having a greater magnitude when said circuit is On and having a lesser magnitude when said circuit is Off; a magnetic gating device associated with each said non-linear circuit provided with a control winding, a bias winding, an input winding and an output winding; the control winding of each said gating device coupled to the output winding of its associated non-linear circuit and the output winding of said gating device coupled to the On input winding of the succeeding non-linear circuit of said register; the input winding of alternate gating devices and the Off input winding of each non-linear circuit associated with said alternate gating devices connected in series to constitute a first and a second information line whereby the energization of one of said information lines causes a non-linear circuit in the On state to be turned Off and provide an output signal from its associated gating device which turns On the succeeding non-linear circuit of said register.

3. A chain of magnetic elements for storing a plurality of pulses including the combination of a plurality of ferro-resonant flip-flops each having an On input winding, an Off input winding and an output winding, each said flip-flop producing a current output having a greater magnitude when said flip-flop is On and having a lesser magnitude when said flip-flop is Off; a gating device associated with each said flip-flop each comprising a bistable magnetic core provided with a control winding, a bias winding, an input winding and an output winding; the control winding of each said gate being coupled to the output winding of the previous flip-flop of said chain and the output winding of each said gate being coupled to the On input winding of a subsequent flip-flop of said chain, the input winding of each alternate gate and the Off input winding of the preceding flip-flop of said chain connected in series to constitute a first and a second information line whereby one of said information lines upon energization causes a flip-flop in the On state to be switched Off and gating the device coupled to the output of the flip-flop switched to transfer a pulse through said gate to turn On the succeeding flip-flop in the chain.

4. An information transfer circuit comprising in combination, a non-linear ferroresonant circuit having an On and an Off input and an output; a magnetic pulse gate having an input, output, bias and control winding, means connecting the control winding of said gate with the output of said non-linear circuit, and means for transferring information in said circuit including means connecting the input winding of said gate with the Off input of said non-linear circuit.

5. The circuit of claim 4 wherein said gate is a magnetic core capable of attaining different stable states of flux density and said bias winding is adapted to be energized and bias said core in a datum stable state.

6. The circuit of claim 4 wherein the input winding of said gate and the Off input of said non-linear circuit are serially connected.

References Cited in the file of this patent

UNITED STATES PATENTS

| | | |
|---|---|---|
| 2,753,545 | Lund | July 3, 1956 |
| 2,861,260 | Wesslund et al. | Nov. 18, 1958 |
| 2,881,412 | Loev | Apr. 7, 1959 |
| 2,907,987 | Russell | Oct. 6, 1959 |

UNITED STATES PATENT OFFICE
CERTIFICATION OF CORRECTION

Patent No. 3,002,184 September 26, 1961

Walter E. Proebster

It is hereby certified that error appears in the above numbered patent requiring correction and that the said Letters Patent should read as corrected below.

Column 1, line 28, for "Accordingly," read -- According --; column 3, lines 23 to 25, strike out "The current signals I, through $I_5$, are applied to windings 1 through 5, respectively, of FIG. 1." and insert instead -- The current signals $I_1$ and $I_2$ are applied to the control winding 2; signals $I_3$ are applied to winding 3; and signals $I_5$ are applied to winding 5 of FIG. 1. --; line 43, after "i.e.," insert -- neither --; lines 45 and 46, for "simultaneously" read -- coincidently --; line 57, for "are" read -- can be --; line 59, after "winding 2" insert -- coincidently with pulses $I_3$ of the same polarity on winding 3 --; line 63, after "2" insert -- coincidently with an input pulse $I_3$ on winding 3 --; column 4, line 18, after "blocks" insert $I_3$ --; lines 22, 48 and 50, after "pulses", each occurence, insert -- $I_3$ --; line 29, after "control" insert a comma; line 64, for "Circuit" read -- Circuits --.

Signed and sealed this 8th day of May 1962.

(SEAL)
Attest:

ERNEST W. SWIDER
Attesting Officer

DAVID L. LADD
Commissioner of Patents